United States Patent [19]

Cortesi

[11] Patent Number: 5,096,031
[45] Date of Patent: Mar. 17, 1992

[54] DEVICE FOR SELECTING AND ENGAGING GEARS IN AN AUTOMATIC VEHICLE GEARBOX

[75] Inventor: Giorgio Cortesi, Brescia, Italy

[73] Assignee: Iveco Fiat S.p.A., Turin, Italy

[21] Appl. No.: 527,528

[22] Filed: May 23, 1990

[30] Foreign Application Priority Data

May 26, 1989 [IT] Italy ................................ 67404 A/89

[51] Int. Cl.⁵ .............................................. B60K 41/22
[52] U.S. Cl. .................................. 192/3.58; 192/3.62; 192/83; 74/473 P
[58] Field of Search ...................... 192/3.62, 3.56, 3.58, 192/83; 74/473 P, 473 R

[56] References Cited

U.S. PATENT DOCUMENTS 4,505,364  3/1985  Goucher et al. ............... 192/3.58 X
4,570,765  2/1986  Makita ............................... 192/3.56

FOREIGN PATENT DOCUMENTS 0107761  5/1984  European Pat. Off. .
3610494  10/1987  Fed. Rep. of Germany .
2172943  10/1986  United Kingdom .

Primary Examiner—Rodney H. Bonck
Attorney, Agent, or Firm—Kane, Dalsimer, Sullivan, Kurucz, Levy, Eisele and Richard

[57] ABSTRACT

The apparatus substantially comprises a manually operated lever for a gearbox that oscillates on one plane and can be set in a first position and in a second angular position in each of which the driving devices of the apparatus are activated, respectively, in a first and in a second configuration in which they control the manoeuvres for selecting and engaging, respectively, a higher or lower gear, and that may also be set into a third and a fourth angular position corresponding to a greater angle than that reached in the previous positions and in each of which said driving devices are activated respectively in a third and in a fourth configuration in which they control the manoeuvres for selecting and engaging a higher or lower gear, the manoeuvers being performed with a greater activating force than that with which the same manoeuvres are performed with the lever in the first or second position; the apparatus also comprises a resistance device adapted to generate a resistant torque of a preset value for moving the gear lever from the first to the third angular position and from the second to the fourth angular position.

5 Claims, 4 Drawing Sheets

— 5,096,031 —

DEVICE FOR SELECTING AND ENGAGING GEARS IN AN AUTOMATIC VEHICLE GEARBOX

BACKGROUND OF THE INVENTION

The present invention relates to a device for selecting and engaging gears in an automatic vehicle gearbox.

These devices comprise driving means that may be activated in a first or a second configuration in which they select and engage the gear, respectively, immediately higher or lower than the one engaged when the means were activated.

These devices also comprise a manually operated lever for changing gear and a plurality of pushbuttons or selectors; this lever may be set in a first and in a second position in each of which said driving means are activated respectively in said first and second configuration set forth above; thus, by moving this lever into one of the two said positions, the driver of the vehicle may select and engage the next gear up or down.

In known devices of the type described briefly above, the gear lever normally oscillates on a plane so as to be set in one of the two angular positions set forth above, but may also be made to oscillate on another plane orthogonal to the previous plane so as to bring it into a third position in which the driving means are activated to bring the gear lever into the neutral position.

Furthermore, the device normally comprises a selector, located normally on the dashboard of the vehicle, which may be set to a position in which, when the gear lever is moved into the first or second angular position set forth above, the driving means are activated in a further configuration corresponding to the selection and engagement of the reverse gear.

Devices of the type described in brief above have several drawbacks.

First of all, if the selecting and engaging manoeuvres and the clutch engaging and disengaging manoeuvres are to be performed in conditions other than those in which they are normally performed, or in emergency conditions, the times required by the driving means to automatically perform these manoeuvres are excessively long; an example of these situations is when the driver has to change gear on a vehicle with a heavy load to drive up a steep hill or when, on a downward slope, he requires the braking action of the gears for greater control of the vehicle. Furthermore, in the devices set forth above, the operations required to activate the driving means corresponding to the neutral position or the selection and engagement of the reverse gear are not simple and instinctive, as they require the gear lever to be moved on different planes from the plane on which the lever oscillates for the selection or engagement of a gear or even manual activation of special acceptor selectors.

SUMMARY OF THE INVENTION

The object of the present invention is to provide a device for selecting and engaging gears in an automatic vehicle gearbox of the type described in brief above, that does not have the drawbacks mentioned above.

According to the present invention, there is provided a device for selecting and engaging gears in an automatic vehicle gearbox comprising at least:

a first electromagnetically driven actuator for the control of gear selecting and engaging manoeuvres on the gearbox, that may be activated by first electrical signals, said actuator being adapted to generate an activating force for the control of said manoeuvres that is proportional to the intensity of said first signals;

a second electromagnetically driven actuator for the control of vehicle clutch engaging and disengaging manoeuvres that may be activated by second electrical signals, said second actuator being adapted to control said manoeuvres at speeds that are proportional to said second signals;

a manually operated gear lever oscillating on a plane that may be set in a first and a second angular position, there being for said lever transducing means adapted to generate electrical position signals corresponding to the setting of the lever in one of the two said positions;

an electronic control unit adapted to generate said first and second electrical signals with preset intensity levels for controlling the selection or engaging of a higher or lower gear when said gear lever is set, respectively, in said first or second position, and said control unit comprising means for generating an acceptor signal for selecting and engaging a lower gear only when the number of motor revolutions per minute goes below a preset level, characterized by the fact that said lever may be set in a third and a fourth angular position in each of which said transducing means are adapted to generate corresponding electrical position signals corresponding to the setting of the lever in said positions, said electronic control unit being set for generating first electrical signals with higher intensity levels than said preset intensity levels when said gear lever is set in said third and fourth position to control the selecting and engaging manoeuvres, respectively, of a higher or lower gear with greater driving force than that with which the same manoeuvres are performed with said lever set in said first and second position, and said electronic control unit also being set to generate second electrical signals with higher intensity levels than said intensity levels when said gear lever is set in said third and fourth position for controlling the clutch engaging and disengaging manoeuvres at a higher speed than that at which the same manoeuvres are performed with said lever set in said first and second position.

BRIEF DESCRIPTION OF THE DRAWINGS

The present invention will be described by way of example with reference to the accompanying drawings in which.

DETAILED DESCRIPTION OF THE INVENTION

Figure 1:
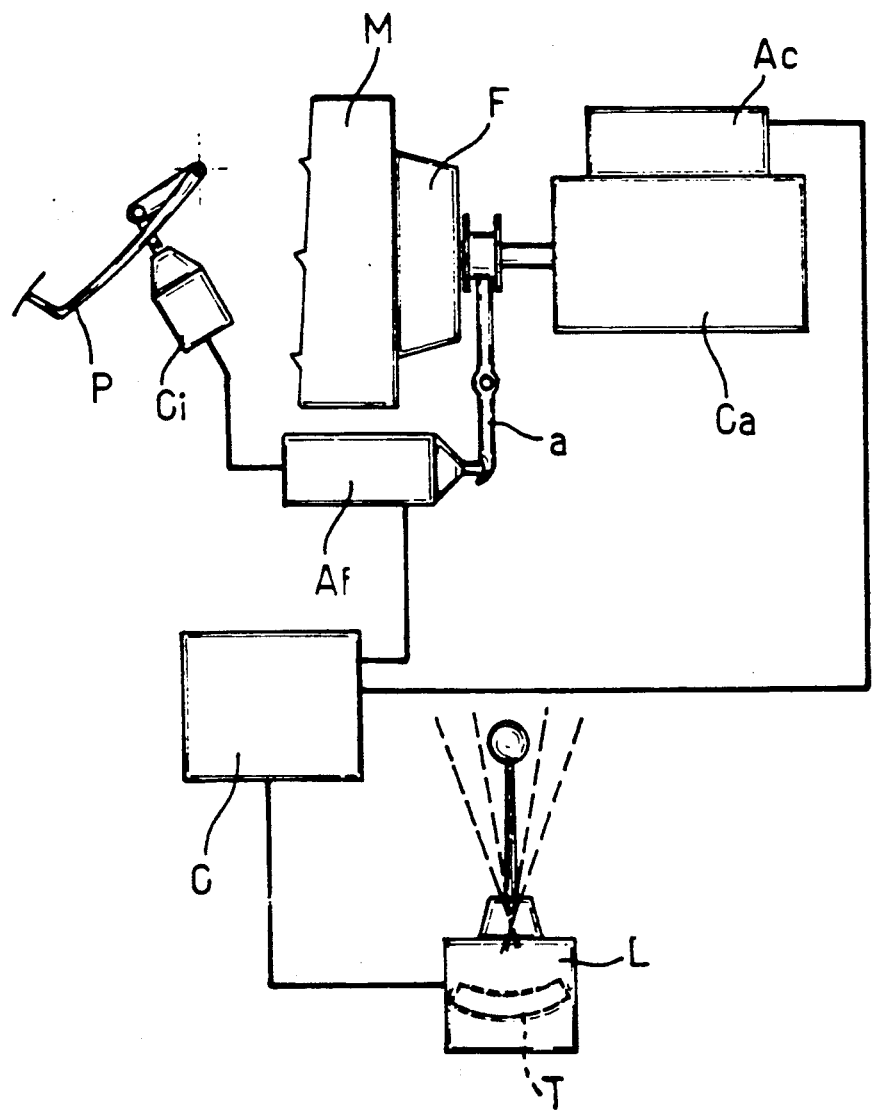
FIG. 1 is a schematic diagram of the device to illustrate its main components.

The device constituting the invention is adapted to be used in conjunction with an automatic vehicle gearbox, indicated by $C_a$ in FIG. 1, and substantially comprises an electromagnetically driven actuator $A_c$ for controlling the gear selecting and engaging manoeuvres in a gearbox $C_a$, that may be activated by electrical signals generated by an electronic control unit C. Said actuator is of the type adapted to generate an activating force for controlling said manoeuvres, in proportion to the intensity of the electrical signals transmitted to the actuator; said actuator is suitably designed in accordance with the specifications contained in Italian patent application of applicant No. 67 946-A/88 of Oct. 21, 1988 entitled: "Hydraulic actuator unit adapted to control gear selecting and engaging manoeuvres in a mechanical vehicle gearbox".

The device also comprises an electromagnetically driven actuator $A_f$ for controlling (by means of a lever a) the engaging and disengaging manoeuvres of clutch F of the motor vehicle, that may be activated by electrical signals generated by control unit C. Said actuator is of the type adapted to control said manoeuvres at speeds that are proportional to the intensity of the signals transmitted by control unit C. Actuator $A_f$ may also be activated by clutch pedal P by means of a hydraulic cylinder $C_i$ when the device is not set for performing completely automatic handling of the gear manoeuvres in gearbox $C_a$.

Figure 2:
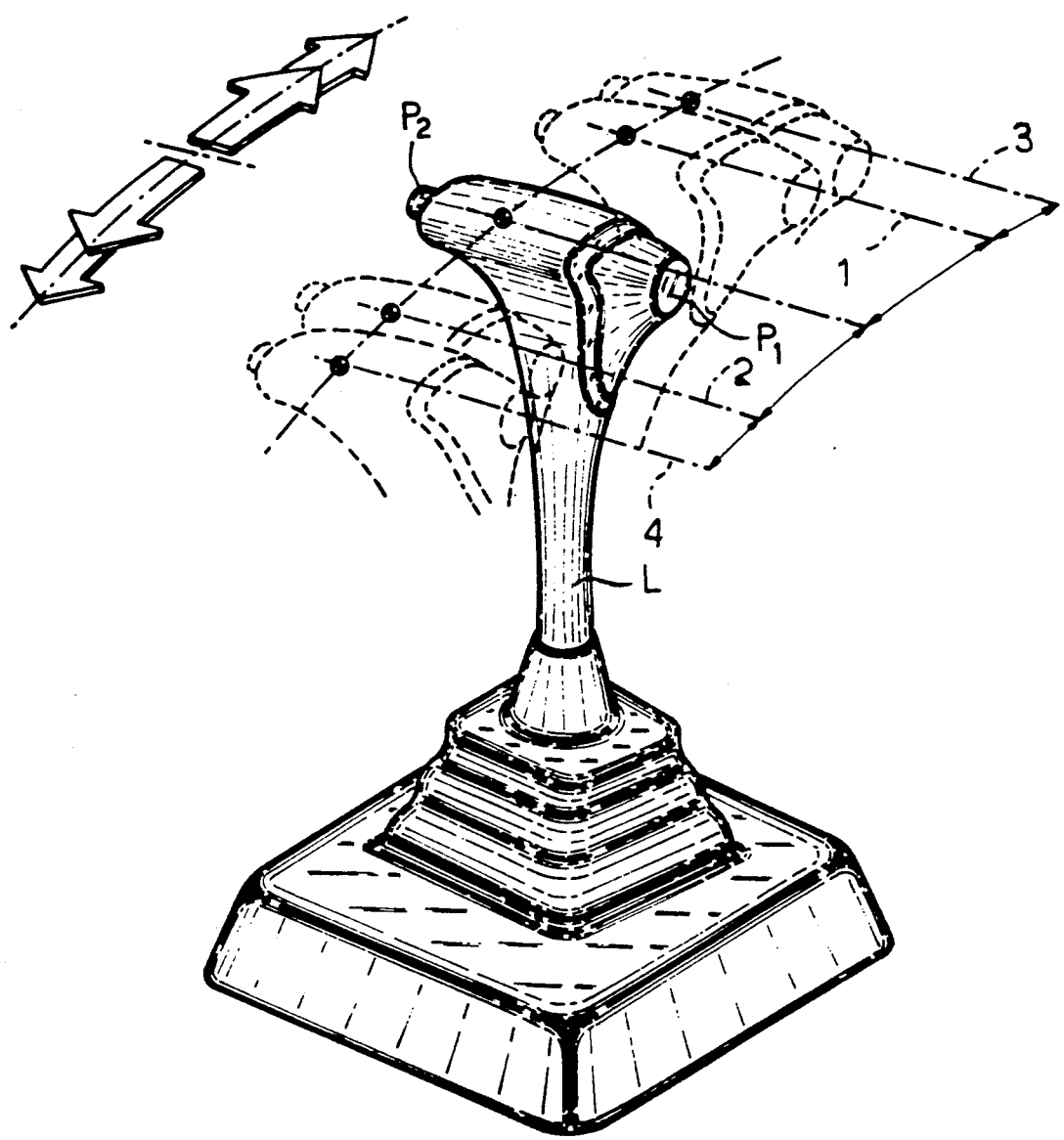
FIG. 2 is a perspective view of the gear lever that forms a part of the device constituting the invention.

Actuator $A_f$ is suitably designed in accordance with the specifications contained in Italian patent application of Applicant No. 67 948-A/88 of Oct. 21, 1988 entitled: "Hydraulic actuator unit for activating the friction clutch of a motor vehicle". The device also comprises a manually operated gear lever L (FIGS. 1 and 2), oscillating on a plane, that may be set in a first or second angular position, indicated respectively by 1 and 2 in FIG. 2; said lever interacts with transducing means T (FIG. 1) adapted to generate electrical position signals corresponding to the setting of the lever in one of the two said positions. When lever L is in its rest position, it is centred between positions 1 and 2.

Whenever lever L is moved into position 1 or 2, electronic control unit C, by means of the signals it receives from transducer T, is adapted to generate electrical signals for activating actuators $A_c$ and $A_f$ which have preset intensity levels for controlling the selection and engagement, respectively, of a higher or lower gear and the engaging and disengaging manoeuvres of clutch F; said intensity levels may be appropriately modulated, as described in the patent applications mentioned above, so as to perform the manoeuvres with a force that is substantially equal to that applied by the driver when they are performed manually. Control unit C may comprise known means (not represented) adapted to generate a consent signal for selecting and engaging a lower gear only when the number of motor revolutions per minute is lower than a preset value; said means are activated when the gear lever is moved into position 2. Thus, when lever L is brought into one of the two said positions, the next gear up or down is selected and engaged in a completely automatic fashion.

Furthermore, lever L may be set in a third and in a fourth angular position, indicated respectively by 3 and 4 in FIG. 1, corresponding to a greater angle than that reached in the first and second angular position.

In each of positions 3 and 4, the transducing means T (FIG. 1) are adapted to generate electrical position signals corresponding to the setting of lever L in the same positions; when the lever is set in positions 3 and 4, control unit C, as a result of the action of the signals generated by transducer T, is preset for generating electrical signals transmitted to actuators $A_c$ and $A_f$ for controlling the selection and engagement respectively of a higher or lower gear; but the signals that are generated in these conditions have a greater intensity than that of the signals generated when lever L is in positions 1 and 2. In this way, the force with which the gear selecting and engaging manoeuvres, by means of actuator Ac, and the clutch engaging and disengaging manoeuvres, by means of actuator Af, are performed, is greater than the force with which the same manoeuvres are performed when lever L is set in positions 1 and 2. Said manoeuvres are therefore performed at higher speeds and thus in less time, as required when they are to be performed in non-normal conditions and, in particular, in emergency conditions.

Furthermore, control unit C is set in a such a way that when lever L is in position 4 which corresponds to the engagement of a lower gear, it generates a consent signal for the engagement of a lower gear even if the number of motor revolutions per minute is greater than the number of revolutions per minute below which the same consent signal was generated with lever L in position 2. In this way, when in emergency conditions, the lever is brought into position 4 which corresponds to the engagement of a lower gear, this manoeuvre becomes possible even if the number of motor revolutions per minute is greater than that corresponding to a change of gear in normal conditions.

Figure 3:
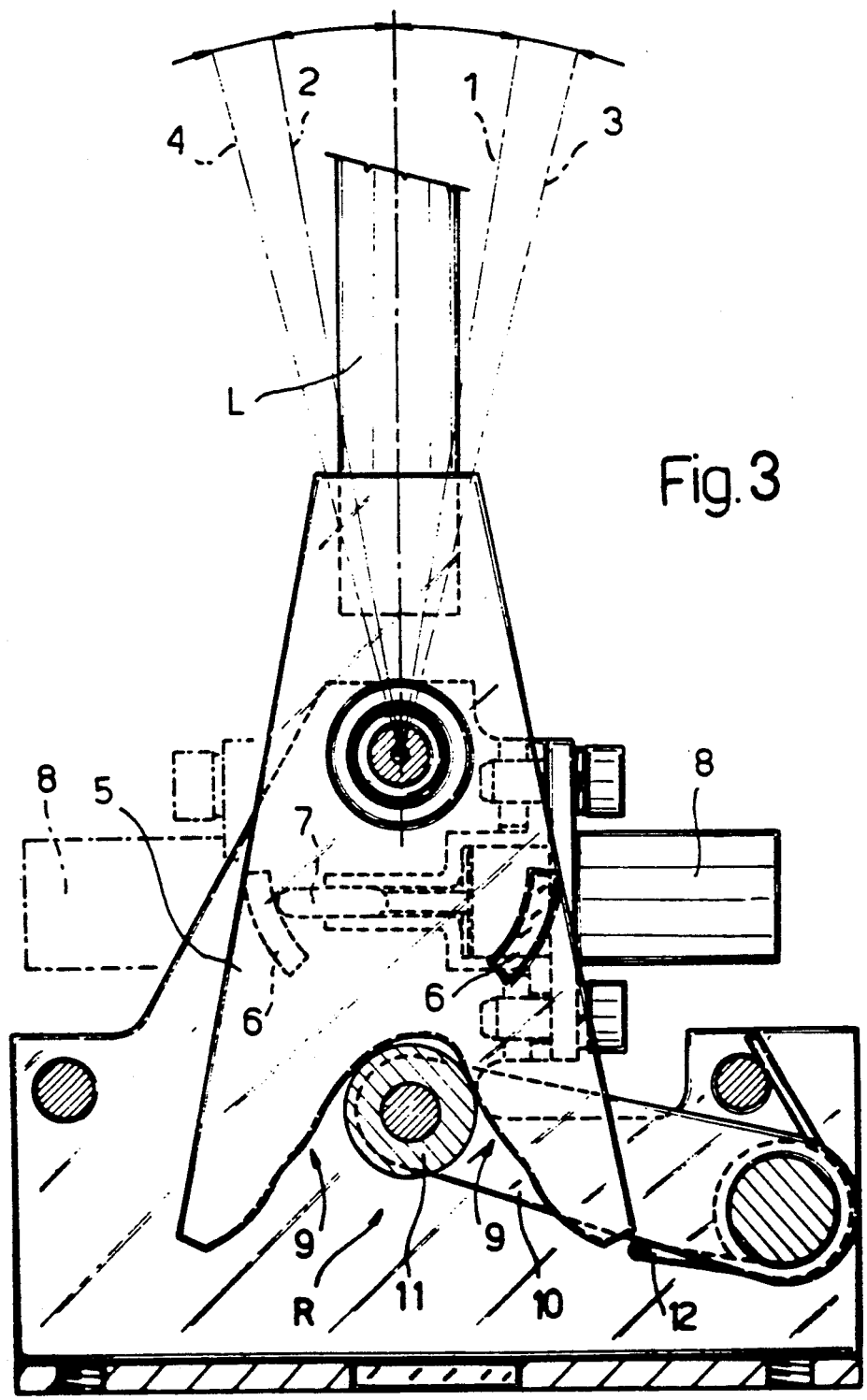
FIG. 3 is a schematic representation of some of the members securely fixed to said lever, also forming a part of the device.

The device also includes means of resistance, represented schematically in FIG. 3 in which they are indicated by the letter R, which are adapted to generate a resistent torque of a preset value for moving lever L from first position 1 to third position 3 and from second position 2 to fourth position 4.

The device also comprises a first pushbutton $P_1$ situated on a side of lever L and adapted to activate actuator $A_c$ to bring it into a configuration in which the gearbox is set in the neutral position.

Pushbutton $P_1$ is suitably set on a side of lever L close to the grip of said lever and moves in a direction that is substantially orthogonal to the plane on which the lever oscillates.

The device also comprises a second pushbutton $P_2$ situated on lever L and adapted to activate actuator $A_c$ to move it into a configuration in which it controls the selection and engagement of reverse gear.

Second pushbutton $P_2$ is suitably situated on a side of lever L close to the grip of said lever and on the opposite side to the one on which the first pushbutton $P_1$ is situated; second pushbutton $P_2$ moves in a direction that is substantially orthogonal to the plane on which lever L oscillates. The driving means may be activated in the configuration set forth above (which corresponds to the selection and engagement of reverse gear) on activation of pushbutton $P_2$ only if lever L has been moved to the first angular position 2 and the vehicle is stationary.

Control unit C is also preset for activating actuator $A_c$ according to a particular programme if lever L is in position 1 or 2 and pushbutton $P_2$ is activated at the same time. On the basis of this programme, not the next gear, but a gear two positions up or down, is selected and engaged.

As can clearly be seen from FIG. 3, lever L may be connected to a plate 5 that oscillates on the plane described above (plane shown in FIG. 3); to plate 5 may be securely fixed at least a first cam 6 adapted to interact with at least one sensor 7 of a position transducer 8 adapted to generate electrical signals indicating the position of lever L and transmitted to control unit C; transducing means T shown in FIG. 1 may also have a different design and comprise, for example, a potentiometer.

Means of resistance R may include a second cam 9 and a small lever 10 fitted with a revolving roller 11 adapted to interact with an active profile of cam 9 and held against said profile by a spring 12 placed between small lever 10 and the frame about which plate 5 revolves.

Figure 4A:
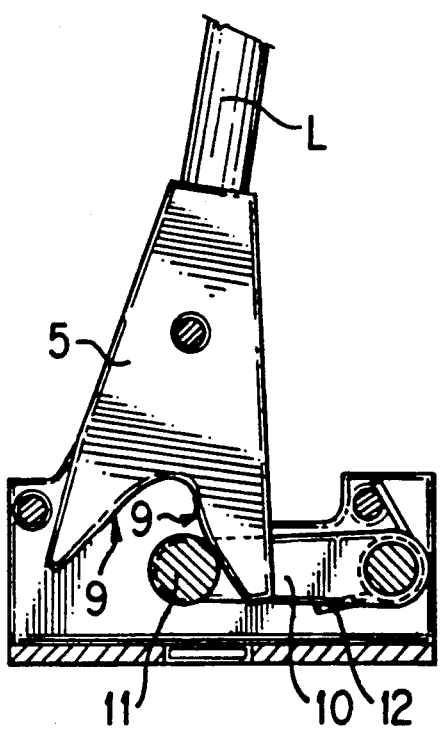
FIGS. 4a, 4b, 5a and 5b show various configurations of said members.
Figure 4B:
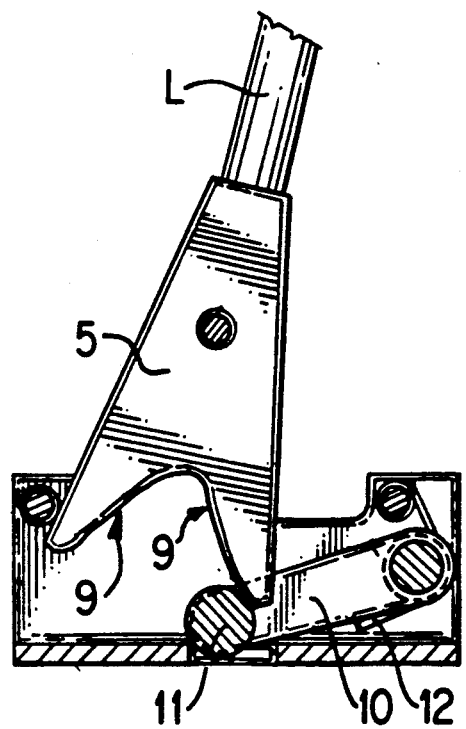
Figure 5A:
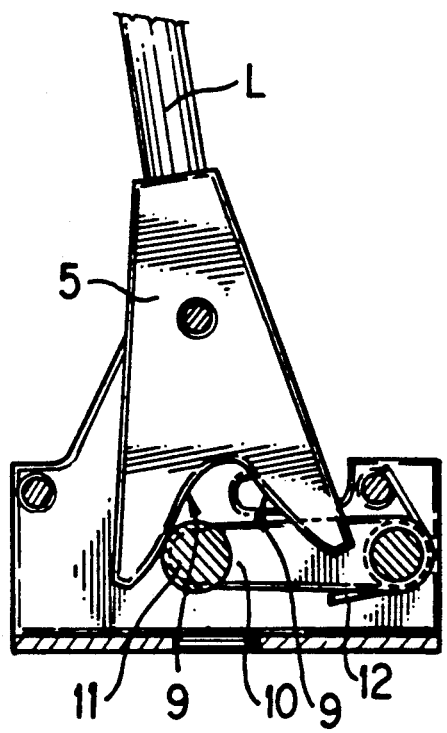
Figure 5B:
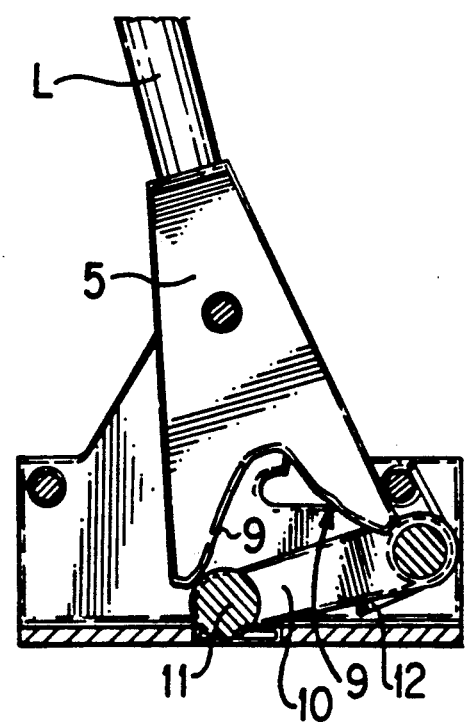

It is therefore evident that the device constituting the invention enables the driver to perform, extremely quickly and instinctively, the operations required for the automatic selection and engagement of a higher or lower gear in emergency conditions or in any other conditions requiring considerably reduced times with respect to normal conditions. In fact, when the driver of the vehicle has decided to change gear and is thus moving lever L into one of positions 1 or 2 (illustrated in FIGS. 4a to 5a), if during this manoeuvre he realizes that, for some emergency situation, the gear change manoeuvre should be performed more quickly than normal, he just needs to continue with the operation already begun, by turning lever L further to move it into position 3 (shown in FIG. 4b) or position 4 (shown in FIG. 5b). It is therefore evident that, to perform these supplementary angular movements, it is not necessary to modify the manoeuvres in progress but simply to complete the manoeuvre already begun in a completely instinctive fashion. Naturally, to prevent said supplementary movements from being accidentally activated during a normal change manoeuvre, means of resistance R are preset to generate a moment of resistance with a preset value so as to enable the manoeuvre to be performed with ease and to give the driver an indication if he does not intend to perform the manoeuvre; the extent of this moment depends on the shape of the profile of cam 9. To move the driving means into the configuration corresponding to the neutral position also requires the driver to perform an extremely quick and simple operation, requiring him to simply press pushbutton $P_1$; this operation is immediate and instinctive, not requiring any oscillation of lever L; furthermore, this operation cannot be confused with the normal gear selecting and engaging manoeuvres, as it entails a pushbutton being pressed rather than lever L being oscillated, an operation that is therefore quite distinct from the other.

Finally, even reverse gear can be engaged quickly and simply by pressing pushbutton $P_2$: this operation does not require the selectors on the vehicle dashboard to be set and may be performed without removing one's hand from gear lever L.

Furthermore, as lever L oscillates on one plane only, it consists of extremely simple mechanisms and occupies little space.

It is evident that variants may be produced and modifications made to the embodiment of the present invention described and illustrated without exceeding the scope of the invention.

I claim:

1. A device for selecting and engaging in an automatic vehicle gearbox comprising at least:
   a first electromagnetically driven actuator ($A_c$) for the control of gear selecting and engaging manoeuvres on the gearbox ($C_a$) that may be activated by first electrical signals, said actuator being adapted to generate an activating force for the control of said manoeuvres that is proportional to the amplitude of said first signals;
   a second electromagnetically driven actuator ($A_f$) for the control of the vehicle clutch (F) engaging and disengaging manoeuvres that may be activated by second electrical signals, said second actuator being adapted to control said manoeuvres at speeds that are proportional to said second signals;
   a manually operated gear lever (L) oscillating on a plane that may be set in a first (1) and a second (2) angular position, there being for said lever transducing means (T) adapted to generate electrical position signals corresponding to the setting of the lever in one of the two said positions; an electronic control unit (C) adapted to generate said first and second electrical signals with preset amplitude levels for controlling the selection or engaging of a higher or lower gear when said gear lever is set, respectively, in said first or second position, and said control unit comprising means for generator an acceptor signal for selecting and engaging a lower gear only when the number of motor revolutions per minute goes below a preset level, characterized by the fact that said lever may be set in a third (3) and a fourth (4) angular position in each of which said transducing means (T) are adapted to generate corresponding electrical position signals corresponding to the setting of the lever in said positions, said electronic control unit (C) being set for generating first electrical signals with higher amplitude levels than said preset amplitude levels when said gear lever is set in said third (3) and fourth (4) position to control the selecting and engaging manoeuvres, respectively, of a higher or lower gear with greater driving force than with which the same manoeuvres are performed with said lever set in said first and second position, and said electronic control unit also being set to generate second electrical signals with higher amplitude levels than said amplitude levels when said gear lever is set in said third (3) and fourth (4) position for controlling the clutch engaging and disengaging manoeuvres at a higher speed than that at which the same manoeuvres are performed with said lever set in said first and second position.

2. A device as claimed in claim 1, characterized in that said lever (L) comprises means for generating a resistant torque of a preset value against movement of said lever from said first (1) to said third (3) angular position and from said second (2) to said fourth (4) angular position.

3. A device as claimed in claim 1 characterized in that when said gear lever is set in said fourth (4) position, said means for generating said acceptor signal for engaging a lower gear are preset to generate said signal only when the number of motor revolutions per minute is lower than said preset number of motor revolutions per minute.

4. A device as claimed in claim 1, characterized in that said lever (L) is securely fixed to a plate (5) that oscillates on said plane to which is securely fixed at least a first cam (6) adapted to interact with at least one sensor (7) of a position transducer (8) adapted to generate electrical position signals.

5. A device as claimed in claim 1, characterized in that said means of resistance (R) comprise a second cam (9) and a small lever (10) fitted with a revolving roller (11) adapted to interact with an active profile of said second cam and held against said profile by a spring (12) placed between said small lever and a frame about which said plate revolves.

* * * * *